United States Patent [19]

Bush et al.

[11] Patent Number: 4,508,689

[45] Date of Patent: Apr. 2, 1985

[54] ALUMINUM-FLUORINE COMPOUND MANUFACTURE

[75] Inventors: J. Finley Bush, New Kensington; Gary F. Gaydoski, Allegheny Township, Allegheny County, both of Pa.

[73] Assignee: Aluminum Company of America, Pittsburgh, Pa.

[21] Appl. No.: 515,805

[22] Filed: Jul. 21, 1983

[51] Int. Cl.³ .......................... C01F 1/00; C01B 7/00; C01B 7/19

[52] U.S. Cl. .................................... 423/127; 423/489; 423/462

[58] Field of Search ............... 423/126, 465, 116, 131, 423/127, 489, 462

[56] References Cited

U.S. PATENT DOCUMENTS

| | | | |
|---|---|---|---|
| 338,061 | 3/1886 | Graetzel | 423/116 |
| 386,704 | 7/1888 | Grabau | 423/126 |
| 512,801 | 1/1894 | Case | 204/67 |
| 2,186,433 | 1/1940 | Schwemmer | 423/116 |
| 3,493,331 | 2/1970 | Vancil et al. | 423/465 |
| 3,825,659 | 7/1974 | Harrison et al. | 423/465 |
| 3,941,874 | 3/1976 | Payne | 423/489 |
| 4,041,137 | 8/1977 | Abe et al. | 423/489 |
| 4,248,849 | 2/1981 | Skaria et al. | 423/489 |
| 4,399,113 | 8/1983 | Tosaka et al. | 423/240 |

FOREIGN PATENT DOCUMENTS

| | | | |
|---|---|---|---|
| 1467265 | 1/1969 | Fed. Rep. of Germany | 423/126 |
| 128494 | 7/1979 | Japan | 423/489 |

OTHER PUBLICATIONS

Basic Fluorides of Aluminum, Cowley and Scott, J. Am. Chem. Soc. 70, 105 (1948).

Primary Examiner—Brian E. Hearn
Assistant Examiner—Stephen J. Kalafut
Attorney, Agent, or Firm—Daniel A. Sullivan, Jr.

[57] ABSTRACT

Method for improving yield of solid, sodium-poor fluoride material from an aqueous solution having ionic species containing sodium, aluminum and fluorine, including neutralizing the solution incompletely to precipitate aluminum fluoride hydroxide hydrate in preference to sodium-containing compounds such as chiolite or cryolite.

10 Claims, 1 Drawing Figure

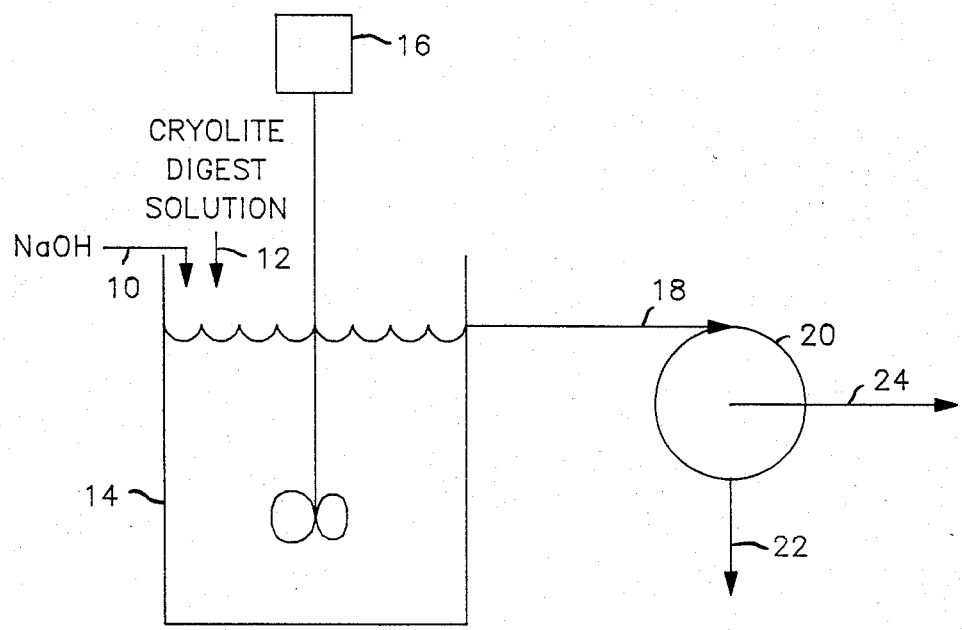

ALUMINUM-FLUORINE COMPOUND MANUFACTURE

SUMMARY OF THE INVENTION

It is an object of the invention to provide a method favoring aluminum fluoride hydroxide hydrate production from aqueous solutions containing sodium, aluminum and fluorine.

This as well as other objects which will become apparent in the discussion that follows are achieved, according to the present invention, by providing a method for improving yield of solid, sodium-poor, fluoride material from an aqueous solution comprising ionic species containing sodium, aluminum and fluorine, comprising neutralizing the solution incompletely to precipitate aluminum fluoride hydroxide hydrate in preference to sodium-containing compounds such as chiolite or cryolite.

BRIEF DESCRIPTION OF THE DRAWING

The sole FIGURE is a process flow schematic of an embodiment of the invention.

DESCRIPTION OF THE PREFERRED EMBODIMENTS

An aqueous solution containing sodium, aluminum and fluorine in ionic species can be obtained by digesting cryolite ($3NaF.AlF_3$) in an $Al_2(SO_4)_3$ aqueous solution (20–150 g/L $Al_2(SO_4)_3$) at greater than 90° C. The pH of such solution will be typically in the range of about 2.0 to 3.0.

Our attempts to produce aluminum fluoride by neutralizing such a solution led to the production of sodium-containing substances such as chiolite or cryolite until we discovered that incomplete neutralization brings about precipitation of aluminum fluoride hydroxide hydrate preference to such sodium-containing substances.

Our findings are as follows:

(1) That incomplete neutralization below about pH 5 while producing aluminum fluoride hydroxide hydrate results in a significant loss of F values.

(2) Incomplete neutralization at a pH of 5.0 to about 5.6 results in the production of aluminum fluoride hydroxide hydrate.

(3) Chiolite is formed at about 5.6–6.0.

(4) Cryolite thereafter.

A most important concept here is the discovery that these ranges exist. The particular pH values defining a given range may vary somewhat on the basis of secondary influences, but their values may be determined for a given syste without undue experimentation.

To minimize contamination by the anionic portion of the solvent, e.g. to minimize sulfur in the product, and also to minimize sodium contamination, it is helpful to saturate the aqueous solution in $F^-$. The speed with which the incomplete neutralization is brought about is also important in this regard; the incomplete neutralization should be accomplished in less than 4 or 5 seconds. Also, to keep sulfur low and maintain reasonable production rates, it is desirable that the ratio dissolved $AlF_3$ to unreacted $Al_2(SO_4)_3$ be greater than 0.4. This ratio is desirably limited on the upper side at 0.7, since otherwise the volume of liquid to be handled becomes too great.

Temperature T during precipitation is in the range 50° C. $\leq$ T < boiling temperature, with a preference for the range 70°–80° C.

The aluminum fluoride hydroxide hydrate precipitate gives an X-ray diffraction pattern matching that for the corresponding substance of cards 18–24 and 4–0196 of the Joint Commmittee on Powder Diffraction Standards, Swarthmore, Pennsylvania and as reported by Cowley and Scott in their Table II at J.Am. Chem. Soc. 70, 105 (1948). Upon calcination at e.g. 550° C. to drive off its water, the major portion of the material is aluminum fluoride. In this form, it is a suitable material for feeding to aluminum metal producing Hall-Heroult cells for $AlF_3$ makeup. Any aluminum oxide portion of the calcined substance is consumed in the electrolysis. Advantageously, following calcination, the material is washed to reduce sodium and sulfur by removal of water-soluble compounds thereof.

The invention, while applicable where the starting material is cryolite as above discussed, is also useful as a process stage in the processing of materials, e.g. contaminated with cryolite. For instance, in U.S. Pat. No. 2,186,433, worn out carbon lining from Hall-Heroult cells is treated with aqueous $AlCl_3$ or $Al_2(SO_4)_3$, plus HCl or $H_2SO_4$ as a function of the $Al_2O_3$ content of the lining. The extract solution there is worked to produce cryolite by addition of HF and NaCl. The present invention provides a route to a product which, unlike cryolite, is poor in sodium.

The incomplete neutralization may be done in a batch mode, where caustic is added to the pregnant liquor solution and the pH raised to the 5.0 to 5.6 range. Desirably, however, a continuous system is used where caustic and liquor are added simultaneously to a stirred vessel at e.g. 80° C. and in the 5.0 to 5.6 pH range.

The FIGURE illustrates the continuous mode, where aqueous NaOH is flowing continuously through line 10 and cryolite digest solution enters continuously through line 12. The reactor 14, with stirring apparatus 16, is of the type termed a back mix flow reactor by Levenspiel, *Chemical Reaction Engineering*, John Wiley and Sons (1962) and a continuous stirred-tank reactor in Section 4 of Perry & Chilton's *Chemical Engineers' Handbook*, 5th Ed., McGraw-Hill (1973). Product solution continuously leaves by line 18 to filter 20 for separation into a solids stream 22 of aluminum fluoride hydroxide hydrate and a liquid stream 24.

Further illustrative of the invention is the following example:

EXAMPLE

Liquor was prepared by mixing cryolite, $Al_2(SO_4)_3$ and water, and digesting the resultant mixture at 95°–98° C. Sufficient cryolite was used to provide a 25 g/L fluorine content in the mixture. $Al_2(SO_4)_3$ was added to provide a 107.7 g/L initial $Al_2(SO_4)_3$ content. The digest was continued until equilibrium was reached, then allowed to cool. At 74° C., the fluorine solution concentration measured 21 g/L, indicating a suppression of F solubility due to the $Na_2SO_4$ present.

On the basis of the equation:

$$2(AlF_3.3NaF) + Al_2(SO_4)_3 \longrightarrow 4AlF_3 + 3Na_2SO_4,$$

37.7 g/L $Al_2(SO_4)_3$ participates in the reaction with the cryolite at 25 g/L F so that unreacted $Al_2(SO_4)_3$ is 70 g/L. The 21 g/L F in solution calculates to 30.9 g/L dissolved $AlF_3$, which makes the ratio dissolved $AlF_3$ to unreacted $Al_2(SO_4)_3$ equal to 0.44.

Approximately 500 mL of liquor was rapidly neutralized with caustic to the desired pH and used as a start solution in reactor 14. Liquor, saturated with respect to F, was fed continuously to the reactor at a rate of 1 L/hr. (16.7 mL/min.) and neutralized with 25% caustic (319 g/L). The caustic rate was varied, approximately 144 L/hr., to maintain the desired pH. Further details are presented in Table I.

TABLE I
PRECIPITATION OF ALUMINUM-FLUORINE COMPOUND

| Sample No. | Precipitation Conditions | | | |
|---|---|---|---|---|
| | Temperature °C. | | pH Range | |
| | Desired | Achieved | Desired | Achieved |
| 3246 A | 80 | 74 | 5.0–5.4 | 5.1–5.5 |
| C | | | | |

| Sample No. | Precipitation Conditions | | | |
|---|---|---|---|---|
| | F Conc. g/L | | Na Concen. | |
| | Initial | Final | Initial | Final |
| 3246 A | 20.8 | .84 | 17.5 | 45.5 |
| C | | | | |

| Sample No. | Product | | | |
|---|---|---|---|---|
| | Na, wt. % | S, wt. % | Na/S | XRD Analysis * |
| 3246 A | 2.06 | 1.73 | 1.19 | major |
| C | .83 | .69 | 1.20 | — |

| Sample No. | Product XRD Analysis | | | |
|---|---|---|---|---|
| | Amorphous | AlF$_3$ | Sodium Aluminum Oxide | Unidentified |
| 3246 A | minor | — | — | minor |
| C | — | major | minor | trace |

NOTE:
Sample A uncalcined material.
Sample C washed calcined material.
*Aluminum fluoride hydroxy hydrate Sample No. 3246 A was filtered material washed with two cake volumes of hot deionized water (to remove water soluble material, particularly water soluble sodium and sulfur) and dried. One-half of the dried material was calcined at 550° C. and repulped to form approximately a 10% slurry and filtered. Two cake volumes of hot deionized water was used to wash the cake and one-half of the cake was dried and marked Sample No. 3246 C.

Results are shown in Table I. With the pH held between 5.1 and 5.5, only aluminum fluoride hydroxy hydrate was produced, no cryolite or chiolite.

Even in the case of Sample A, the sulfur (S) and sodium (Na) are low, indicating that the S and Na can be washed from the material. Calcining, followed by washing, permits further reduction of Na and S.

The AlF$_3$ content of Sample C was 54.4 wt. %. The X-ray diffraction pattern obtained for Sample C was matched to cards 9-138 and 29-1164 of the Joint Committee on Powder Diffraction Standards, indicating the presence of, respectively, a major amount of AlF$_3$ and a minor amount of sodium aluminum oxide.

It will be understood that the above description of the present invention is susceptible to various modifications, changes and adaptations and the same are intended to be comprehended within the meaning and range of equivalents of the appended claims.

What is claimed is:

1. Method for improving yield of solid, sodium-poor fluoride material from an aqueous solution comprising ionic species containing sodium, aluminum and fluorine, the solution also containing sulfate ions, comprising neutralizing the solution from an acidic state saturated with respect to fluoride incompletely with an aqueous basic sodium compound to increase the pH into the range of about 5.0 to 5.6 to precipitate material consisting essentially of aluminum fluoride hydroxide hydrate in preference to more than minor amounts of chiolite or cryolite or other sodium compounds.

2. Method as claimed in claim 1, further comprising washing the aluminum fluoride hydroxide hydrate.

3. Method as claimed in claim 2, further comprising calcining the aluminum fluoride hydroxide to decompose it to material comprising aluminum fluoride.

4. Method as claimed in claim 3, further comprising washing the aluminum fluoride.

5. Method as claimed in claim 4, the incomplete neutralizing being accomplished in less than about 5 seconds.

6. A method as claimed in claim 1, the solution initially having a pH in the range of about 2.0 to 3.0.

7. A method as claimed in claim 6, wherein aluminum fluoride hydroxide hydrate is precipitated, essentially to the exclusion of chiolite or cryolite or other sodium compounds.

8. A method as claimed in claim 1, wherein the aqueous solution contains more than trace amounts of sodium.

9. A method as claimed in claim 1, the aqueous solution being obtained by digesting cryolite or cryolite-containing carbon lining from Hall-Heroult cells.

10. A method as claimed in claim 1, the basic sodium compound comprising NaOH.

* * * * *

UNITED STATES PATENT AND TRADEMARK OFFICE
CERTIFICATE OF CORRECTION

PATENT NO. : 4,508,689
DATED : April 2, 1985
INVENTOR(S) : J. Finley Bush and Gary F. Gaydosik It is certified that error appears in the above—identified patent and that said Letters Patent is hereby corrected as shown below:

| | |
|---|---|
| Col. 1, line 39 | After "hydrate" insert --in--. |
| Col. 1, line 55 | Change "syste" to --system--. |
| Col. 1, line 65 | Change "Al$_2$SO$_4$)$_3$" to --Al$_2$(SO$_4$)$_3$--. |
| Col. 3, line 7 | Change "144 L/hr." to --.144 L/hr.--. |

Signed and Sealed this

Twentieth Day of August 1985

[SEAL]

Attest:

Attesting Officer

DONALD J. QUIGG

Acting Commissioner of Patents and Trademarks

UNITED STATES PATENT AND TRADEMARK OFFICE
CERTIFICATE OF CORRECTION

PATENT NO. : 4,508,689
DATED : April 2, 1985
INVENTOR(S) : J. Finley Bush and Gary F. Gaydosik It is certified that error appears in the above-identified patent and that said Letters Patent is hereby corrected as shown below:

On the title page, Item (75) should read
--Gary F. Gaydosik --.

Signed and Sealed this

Seventeenth Day of September 1985

[SEAL]

Attest:

Attesting Officer

DONALD J. QUIGG

Commissioner of Patents and
Trademarks—Designate